Patented May 19, 1936

2,041,502

UNITED STATES PATENT OFFICE 2,041,502

ARTIFICIAL MASSES

Arthur Voss, Frankfort-on-the-Main, and Ewald Dickhäuser, Gersthofen, near Augsburg, Germany, assignors to I. G. Farbenindustrie Aktiengesellschaft, Frankfort-on-the-Main, Germany No Drawing. Original application June 4, 1929, Serial No. 368,434. Divided and this application July 9, 1935, Serial No. 30,470. In Germany June 14, 1928

2 Claims. (Cl. 260—2)

This application is a division of our application Serial No. 368,434 filed June 4, 1929.

The present invention relates to artificial masses.

It is already known to polymerize vinyl chloride so as to obtain masses of high molecular weight. Methods for carrying out this polymerization process have been described in our co-pending U. S. application Serial No. 368,434 filed June 4, 1929.

We have now found that the polymerization may also be carried out in the presence of such substances as are also capable of being polymerized, particularly in the presence of acrylic acid. The mixed polymerization products of vinyl chloride and acrylic acid thus produced show particularly valuable properties. It is a surprising fact that in this case the polymerization does not proceed in such a manner that the final product constitutes a mere mixture of the polymerized products of the respective components,— the final product possesses not even the properties which would have to be taken as the average of the properties of the various components— but there are generally formed products of specifically new properties.

The polymerized products thus obtained after being freed from any volatile constituents, for instance by distillation with water vapor or by treating them in vacuo, can be worked up like celluloid into commodities of the most varied kind. If the polymerization is carried out in a suitable manner, the polymerized product is obtained in the desired form. As the polymerized product is capable of being softened, any desired shape may be given to it by pressing. The solid masses thus obtained may further be worked up by cutting, filing, sawing them etc. Furthermore the polymerized products may not only be worked up alone but also combined with any other substances, such as resins, oils, cellulose derivatives or filling materials of any kind.

The present invention constitutes a great industrial progress because it permits of preparing in an industrially satisfactory manner new substances of great value for various industrial purposes.

The quantitative proportions in which the two components vinyl chloride and acrylic acid may be used may vary within wide limits. There may be polymerized a mixture of about equal parts by weight of both components or there may also be polymerized 2 to 3 parts of the one component and 1 part of the other component.

The polymerization may be carried out in a manner known for products of this kind. Useful polymerization processes carried out with the aid of heat and for instance in the presence of catalysts have been described in our co-pending U. S. application Serial No. 368,434.

The following example illustrates our invention but it is not intended to limit it thereto, the parts being by weight.

100 parts of vinyl chloride, 115 parts of acrylic acid and 1 part of benzoyl peroxide are dissolved in 500 parts of methylene chloride and the solution is heated in the autoclave for 10 hours to 60° C.–70° C., while stirring. The mixed polymerization product from vinyl chloride and acrylic acid thus produced is obtained in the form of a finely suspended powder which is filtered by suction from the methylene chloride and dried. The product is soluble in hot water, alkali and alcohol and it is fast to light, humidity and acids.

We claim:

1. As new products polymerization products of mixtures of vinyl chloride and acrylic acid, said products being amorphous, colorless masses fast to light, humidity and acids.

2. As a new product the polymerization product of a mixture of about equal parts of vinyl chloride and acrylic acid, said product being an amorphous, colorless mass fast to light, humidity and acids.

ARTHUR VOSS.
EWALD DICKHÄUSER.